United States Patent [19]

Kato

[11] Patent Number: 4,574,395
[45] Date of Patent: Mar. 4, 1986

[54] PICTURE IMAGE FILING APPARATUS

[75] Inventor: Hiroshi Kato, Kanagawa, Japan

[73] Assignee: Fuji Xerox Co., Ltd., Tokyo, Japan

[21] Appl. No.: 571,169

[22] Filed: Jan. 16, 1984

[30] Foreign Application Priority Data

Jan. 14, 1983 [JP] Japan .................................. 58-3412

[51] Int. Cl.⁴ .......................... G06K 9/00; G06F 7/10
[52] U.S. Cl. .................................... 382/61; 235/375;
364/518; 364/900; 382/56
[58] Field of Search .................... 382/56, 61; 235/379,
235/375; 353/25; 364/900 MS File, 518-523;
358/102; 369/49; 360/27; 365/235

[56] References Cited

U.S. PATENT DOCUMENTS

| 4,264,808 | 4/1981 | Owens et al. | 235/379 |
| 4,408,181 | 10/1983 | Nakayama | 364/900 |

*Primary Examiner*—Leo H. Boudreau
*Attorney, Agent, or Firm*—Sughrue, Mion, Zinn Macpeak & Seas

[57] ABSTRACT

Retrieval data to be used in retrieving picture image data from an image memory is carried on the original document itself. The operator need only key-in information indicating the particular area of the original document which contains the retrieval data, and the retrieval data will then be selected from the image signals and stored in the file management memory. Alternatively, a predetermined area of the original document could contain data from which the location of the retrieval data could be determined.

7 Claims, 2 Drawing Figures

PICTURE IMAGE FILING APPARATUS

FIELD OF THE INVENTION

The present invention relates to a picture image filing apparatus and more particularly to a picture image filing apparatus in which the image of an original document is optically read out, then photo-electrically converted, and then stored in a memory as digital picture image information, so that picture image data can be designated as desired and read out of the memory and reproduced as a visual image.

More particularly, the present invention relates to a picture image filing apparatus of the type described above, in which, when the image of an original document is optically read out and stored, a retrieval data written in a portion of the picture image original document together with drawings or the like is simultaneously read out, recognized and stored.

BACKGROUND OF THE INVENTION

With the recent development of a large scale storage medium (memory), picture image filing systems of the type described above have found increasing practical applications, in which various kinds of picture image original documents, such as design drawings, are optically read out, photo-electrically converted, and stored in a memory as digital picture image information, so that a picture image data designated as needed can be read out of the memory to thereby display the image on a cathode ray tube as a visual image, or output as a hard copy.

In such a picture image filing system, it is a serious problem as to how to efficiently perform new registration and retrieval of each picture image.

Conventionally, when a picture image original document is to be written into a memory from an input device, the picture image original document is optically read out, and the read-out data is digitized and stored. At the same time, a retrieval data including the name of the drawing management system, the name of the department/section, the name of the designer/figure drawer, the date of figure drawing, the title, etc., is additionally inputted by means of a keyboard or the like and stored.

Further, in picture image retrieving, an operator of the system inputs first the above-mentioned retrieval data, such as the title of a desired picture image, through a keyboard or the like so as to read out the desired picture image on the basis of the matching of the retrieval data, and the read out picture image is displayed or printed.

Such a conventional method as above, however, is disadvantageous in that not only is the manual input operation of the retrieval data troublesome and inefficient but there is a risk of an incorrect input. Accordingly, it is necessary to provide a method of inputting a retrieval data without manual operation.

SUMMARY OF THE INVENTION

In view of the above-mentioned circumstances, it is an object of this invention to provide a picture image filing apparatus in which, when a command for the read-out of a picture image original document is inputted, a retrieval data can be simultaneously inputted without requiring any manual operation.

In order to attain the above-mentioned object, according to the present invention, the following procedure is employed:

(1) The retrieval data is described at a predetermined portion of the picture image original document, i.e. at a specific portion in each drawing management system.

(2) As the image data is being written into the picture image file of the drawing management system to which the document belongs, the information designating the location of the retrieval data region is read out of a known specific position of the picture image original document, or is inputted through a keyboard or the like, so as to designate the location of the retrieval data region.

(3) Among the original document picture image data (digital and analog), the data located in the region designated in the above-mentioned step (2) is subjected to a pattern recognition process. As a result, the recognized characters, numerals, marks etc. are encoded to form a digital signal.

(4) When it is desired to retrieve a specific drawing from the picture image file, an attributive data peculiar to the specific drawing is inputted as the retrieval data through a keyboard or the like, so as to search the above-mentioned picture image file management information table memory and read out the picture image whose retrieval data is coincident with the input retrieval data. In this case, both the picture image and the retrieval data are made to be visual images.

(5) In this case, the retrieval data regions are arranged so as to make it possible to be individually designated for every picture image file group (the term "group" is defined as a collection of picture images which are drawn on a series of paper of the same format and which belong to a certain picture image file management system).

(6) Finally, it is preferable to subdivide a retrieval data region into a plurality of fields so that a plurality of attributive retrieval data can be stored. This makes it possible to perform retrieval and inquiry in a more efficient manner.

BRIEF DESCRIPTION OF THE DRAWINGS

An embodiment of the present invention will now be described with reference to the drawings, in which.

DETAILED DESCRIPTION OF THE PREFERRED EMBODIMENT

Figure 1:
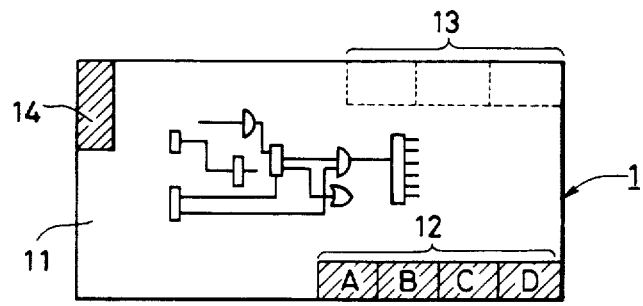
FIG. 1 is a plan view illustrating an example of a picture image original document suitable for use in the picture image filing apparatus according to the present invention.
Figure 2:
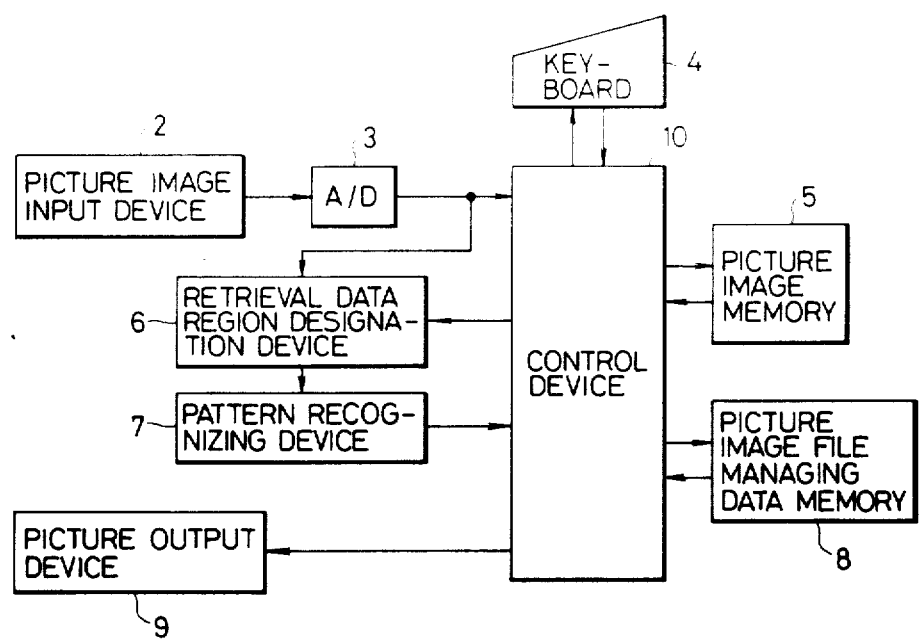
FIG. 2 is a block diagram of an embodiment of the present invention.

Referring now to FIGS. 1 and 2, a picture image original document 1 is constituted by a picture image region 11 in which a picture image such as a figure of a drawing in drawn, and a retrieval data region 12 in which a retrieval data such as characters, marks or the like is described. The retrieval data region 12 may be divided into a plurality of subdivisions 12A, 12B, . . . etc. The retrieval data region may be provided at any other portion as indicated by a dotted line at 13.

When a plurality of picture image original documents (for example design figures, planning drawings of houses, etc.) are generally managed, in many cases these documents are preliminarily classified into plural filing groups (for example a design drawing filing group for every product).

With a view to this type of drawing management, according to the present invention, the retrieval data region on the picture image original document 1 and its subdivisions can be used to distinguish between the respective files.

In FIG. 2, a control device 10 not only controls the operation of the constituent parts which will be described later and the timing of the respective operations, but performs necessary calculation. The control device 10 may be constituted by a microcomputer or the like including an input/output buffer unit.

A picture image input device 2 optically reads out the picture image original document 1 as shown in FIG. 1 and converts it into an analog electrical signal. An A/D converter 3 converts the analog electrical signal into a digital signal.

A keyboard 4 may be a known one for inputting various data or instructions into the control device 10. Particularly, in the embodiment of the present invention, when the picture image original document 1 is newly inputted for storage, a signal designating the appropriate retrieval data region thereon is inputted. The keyboard is also used to input retrieval data when a specific or desired one of the stored images is to be retrieved from among the accumulated picture image file groups.

A picture image memory 5 stores the picture image data (including the retrieval data) read out by the picture image input device 2 and converted into a digital signal by the A/C converter 3.

A retrieval data region designation device 6 is responsive to the retrieval data region designating signal inputted through the keyboard 4 so as to select only the digital signal of the retrieval data region from among the digital image and retrieval region data outputted by the A/D converter 3.

A pattern recognizing device 7 is supplied with the selected retrieval data signal, and then performs a pattern recognizing process in a well-known manner on the basis of the supplied retrieval signal. The device 7 then encodes the recognized pattern, i.e. characters, marks or the like which constitute a retrieval data, and then produces the encoded retrieval data.

A picture image file managing information table memory 8 stores not only the thus encoded retrieval data but also stores the file names of respective picture images, the file addresses, the file capacities, etc.

A picture output device 9 produces, as a visual image, the picture image data selectively read or designated out of the data stored in the picture image memory 5. A cathode ray tube or a copying machine of a facsimile system may be suitably employed as the picture output device 9.

Although the retrieval data region designation device 6 and/or the pattern recognizing device 7 are illustrated as being separate from the control device 10 in this embodiment, they may be incorporated into the control device 10. Further, the analog signal produced from the picture image input device 2 may be used directly as an input to the data region designation device 6.

In the apparatus of the embodiment shown in FIG. 2, the procedure to file/accumulate a new picture image original document and to register the retrieval data thereof is as follows:

(1) Data designating the retrieval data region on the picture image original document, the number of fields, etc. is inputted through a keyboard 4. For example, the coordinates of two points on a diagonal line of the retrieval data region 12 (or the respective subdivided fields 12A, 12B, . . . etc.) may be used as the region designating data.

(2) When a read-out start instruction is issued, the picture image input device 2 reads out the picture image in a suitable manner and produces an analog electrical signal corresponding to the read-out picture image. The thus produced analog electrical signal is converted into a digital signal by the A/D converter 3 and stored in the picture image memory 5 through the control device 10. At this time the retrieval data is also stored in the same form as the picture signal.

(3) Preferably, but not necessarily, simultaneously with the storing operation of the digital signal of the picture image into the picture memory 5, the file name of this picture image, the file address, the file capacity, etc. may be inputted from the keyboard 4 and stored at corresponding columns in the picture image file managing information table memory 8 (this data is not to be confused with the retrieval data which identifies attributes of the drawing as opposed to filing system information). The abovementioned file name of this picture image, the file address, the file capacity, etc. may alternatively be stored in the picture image file managing information table memory 8 during the subsequent steps (4) and (5).

(4) The above-mentioned digital signal from A/D converter 3 is supplied also to the retrieval data region designation device 6, and the digital signal corresponding to the retrieval data, at the region 12 designated by the keyboard 4, is retrieved at this time and supplied to the pattern recognizing device 7.

(5) In the pattern recognizing device 7, the pattern recognizing process is performed in a suitable manner to recognize characters, marks or the like constituting the retrieval data, and this retrieval data is then encoded. The encoded retrieval data is then stored in the picture image file managing information table memory 8 through the control device 10.

In this case, various kinds of retrieval data may be used. By way of example, it is preferable to write one retrieval data into every one field of the retrieval data region 12.

In the case of design drawing file group, the retrieval data may include the file group discriminating symbol, the names of parts, the name of the drawing, the department/section to which the designer belongs, the depart of the figure drawing, the name of the designer and the draftsman. In the case of a home planning figure file group, the retrieval data may include the file group discriminating symbol, the kind (e.g. distinguishing between a house for sale or a house for rent), the location, the transportation facilities, the area, the rental or selling price, the room arrangement plan, etc.

As described above, a desired retrieval data is inputted through the keyboard 4 in order to selectively read out a specific one of the pieces of picture information stored and accumulated in the picture image memory 5 and to make it a visual image. The control device (microcomputer) 10 compares the thus inputted retrieval data with the retrieval data stored in the picture image file managing information table memory 8 and, if coincidence is detected, the file names are displayed in a list on the picture image output device 9 or any other display device.

The user then selects one of the listed files via the keyboard 4, and the selected drawing is displayed as a visual image by the picture image output device. Of course, all drawings whose retrieval data match the inputted retrieval data may be successively displayed as visual images.

Such a retrieving procedure per se is well known, and various techniques may be selectively used as desired. Thus, further detailed description about the retrieving procedure will be omitted herein.

As described above, according to the invention, since the process of manually entering the retrieval data to be stored can be eliminated, not only can the process for storing/accumulating a new drawing be largely simplified to attain the improvement in efficiency, but it is also possible to completely eliminate erroneous data input.

Furthermore, if the following procedure is performed, the manual input of the retrieval data region designating data becomes unnecessary, resulting in further elimination of manual steps and an improvement in reliability.

(a) As shown by the reference numeral 14 in FIG. 1, a retrieval data region designation section is set at a fixed position (a predetermined position common to all the picture image original documents) on each picture image original document 1;

(b) The retrieval data region designation data, which has been described with respect to the abovementioned embodiment to be inputted through the keyboard 4 when the picture image is newly accumulated/registered, is described in this retrieval data designation section 14; and (c) When a picture image original document is newly read in, the signal read out from the retrieval data designation section 14 is retrieved and subject to the pattern processing.

As will be understood from the above-mentioned explanation, according to the present invention, since when a picture image original document is read and newly accumulated/registered, the retrieval data thereof etc. can be inputted without manual operation, the system is easier to use, erroneous inputs are avoided and reliability is improved.

We claim:

1. A picture image filing apparatus, comprising: reading means for optically reading an original document to generate image data representing an image on said document;
   selection means for selecting, from said image data, at least one retrieval data signal representing said retrieval data, said selection means comprising means for detecting selection data among said image data, means responsive to said selection data for generating a selection signal indicating a particular image area containing said retrieval data, and means responsive to said selection signal for selecting said retrieval data signals from said image data; and
storage means for storing said image data together with retrieval data for use in later retrieving said image data from said storage means.

2. A picture image filing apparatus as claimed in claim 1, wherein said storage means comprises an image memory for storing said image data and a file management memory for receiving and storing said retrieval data.

3. A picture image filing apparatus, comprising:

means for optically reading a picture image original document to convert it into an analog electrical signal;

means for converting said analog electrical signal into a digital signal;

first memory means for storing said digital signal as a picture image data;

keyboard means for inputting a signal for designating a retrieval data region in said picture image original document and inputting a retrieval data, or the like;

a retrieval data region designating device, responsive to said retrieval data region designating signal inputted from said keyboard means, for separating a picture image data corresponding to the designated retrieval data region in said picture image original document;

a pattern recognizing means for performing a character/pattern recognition process on the basis of said separated signal;

a second memory means for storing, as a retrieval data, the recognized character/pattern data supplied thereto;

means for searching the storage contents of said second memory means on the basis of retrieval data inputted through said keyboard means, to retrieve a picture image having the same stored retrieval data as the inputted retrieval data; and means for reading out of said first memory means a data of the picture image obtained by the retrieval and for reproducing the picture image as a visual image.

4. A picture image filing apparatus, comprising:

means for optically reading a picture image original document to convert it into an analog electrical signal;

means for converting said analog electrical signal into a digital signal;

first memory means for storing said digital signal as a picture image data;

separating means for separating a first picture image data corresponding to a known specific region in said picture image original document;

retrieval data region designating signal recognizing means for performing a character/pattern recognition process on the basis of said first separated picture image data, to thereby produce, as a retrieval data region designating signal designating a retrieval data region of said picture image original document, a character/pattern obtained as a result of said recognition process;

a retrieval data region designating device responsive to said retrieval data region designating signal for separating a second picture image data corresponding to the designated retrieval data region in said picture image original document;

a pattern recognizing means for performing a character/pattern recognition process on the basis of said separated second picture image data;

a second memory means for storing retrieval data corresponding to the character/pattern data recognized in said pattern recognizing means;

a keyboard means;

means for searching the storage contents of said second memory means on the basis of retrieval data inputted from said keyboard means to retrieve a desired picture image having the same stored retrieval data as the inputted retrieval data; and means for reading out of said first memory means the data of said desired picture image and for reproducing the desired picture image as a visual image.

5. A picture image filing apparatus, comprising:

reading means for optically reading an original document to generate image data representing an image on said document;

selection means for selecting, from said image data, at least one retrieval data signal representing said retrieval data, said selection means comprising keyboard means for entering a selection signal indicating a particular image area containing said at least one retrieval data signal and means responsive to said selection signal for selecting the image data corresponding to said particular image area as said retrieval data; and storage means for storing said image data together with retrieval data for use in later retrieving said image data from said storage means.

6. A picture image filing apparatus as claimed in claim 5, wherein said selection means comprises:

keyboard means for entering a selection signal indicating a particular image area containing said at least one retrieval data signal; and means responsive to said selection signal for selecting the image data corresponding to said particular image area as said retrieval data.

7. A picture image filing apparatus as claimed in claim 5, wherein said selection means comprises recognition means for recognizing said at least one retrieval data signal and encoding means for encoding said at least one retrieval data signal prior to storage.

* * * * *